United States Patent [19]

Sundquist

[11] Patent Number: 5,107,972
[45] Date of Patent: Apr. 28, 1992

[54] ELECTROMAGNETIC CLUTCH ASSEMBLY FOR FOUR WHEEL DRIVE SYSTEMS

[75] Inventor: Drew A. Sundquist, Canton, Mich.

[73] Assignee: Borg-Warner Automotive, Inc., Sterling Heights, Mich.

[21] Appl. No.: 759,214

[22] Filed: Sep. 13, 1991

[51] Int. Cl.5 .................... F16D 11/00; F16D 21/00; F16D 27/00
[52] U.S. Cl. .................... 192/35; 192/48.2; 192/48.5; 192/67 P; 192/84 C
[58] Field of Search ............ 192/35, 67 A, 67 P, 192/53 D, 25, 89 A, 40, 48.2, 48.5, 84 C, 108, 90

[56] References Cited

U.S. PATENT DOCUMENTS

| 991,785 | 5/1911 | Klocke | 192/25 |
|---|---|---|---|
| 2,365,093 | 12/1944 | Meyer | 192/25 |
| 3,054,490 | 9/1962 | Harting | 192/84 |
| 3,240,304 | 3/1966 | Wickersham | 192/56 |
| 3,251,441 | 5/1966 | Winter | 192/18 |
| 3,331,481 | 7/1967 | Wrensch | 192/90 |
| 3,465,862 | 9/1969 | Birdsall | 192/84 |
| 3,507,374 | 4/1970 | Allaben, Jr. | 192/84 |
| 3,573,517 | 4/1971 | Osterstrom | 310/103 |
| 3,752,279 | 8/1973 | Briar | 192/84 |
| 3,943,391 | 3/1976 | Fehr | 310/103 |
| 4,033,438 | 7/1977 | Wiltsey | 192/84 |
| 4,187,938 | 2/1980 | Miller | 192/54 |
| 4,189,042 | 2/1980 | Miller | 192/84 |
| 4,417,641 | 11/1983 | Kageyama | 180/247 |
| 4,446,392 | 5/1984 | Jaeschke | 310/105 |
| 4,504,094 | 3/1985 | Burrows | 192/67 P |
| 4,557,360 | 12/1985 | Kumatani | 192/84 |
| 4,561,320 | 12/1985 | Houpt et al. | 74/128 |
| 4,561,520 | 12/1985 | Fogelberg | 192/53 D X |
| 4,576,061 | 3/1986 | Yamakawa et al. | 74/665 |
| 4,606,444 | 8/1986 | Sekella | 192/48.2 |
| 4,667,767 | 5/1987 | Shea et al. | 180/247 |
| 4,773,518 | 9/1988 | Raad et al. | 192/84 |
| 4,776,441 | 10/1988 | Kagata et al. | 192/0.02 |
| 5,007,498 | 4/1991 | Wiese et al. | 192/35 X |
| 5,048,653 | 9/1991 | Fellows | 192/67 P |

Primary Examiner—Rodney H. Bonck
Attorney, Agent, or Firm—Willian Brinks Olds et al.

[57] ABSTRACT

An electromagnetic clutch assembly (40) especially suitable for use in motor vehicle four wheel drive systems selectively provides power to the front drive components (26, 28, 30). The clutch assembly (40) includes a through drive shaft (42) about which a clutch armature (100), clutch rotor (110), output drive sprocket (76) and other components are coaxially disposed. The drive shaft (42) receives a plurality of spring biased fingers (56) which selectively couple the shaft (42) to the drive sprocket (76). The fingers are translated axially by a like plurality of cam lobes (122) on the rotor (110). A torsion spring (154) maintains the cam lobes (122) in alignment with the fingers (56). When an electromagnetic coil (130) adjacent the rotor (110) is activated, the drag from the associated front wheel drive components (26, 28, 30) slows the clutch armature (100) and the rotor (110), rotating the rotor (110) and cam lobes (122) relative to the drive shaft (42) and allowing the fingers (56) to translate axially, thereby coupling the output drive sprocket (76) to the drive shaft (42).

20 Claims, 4 Drawing Sheets

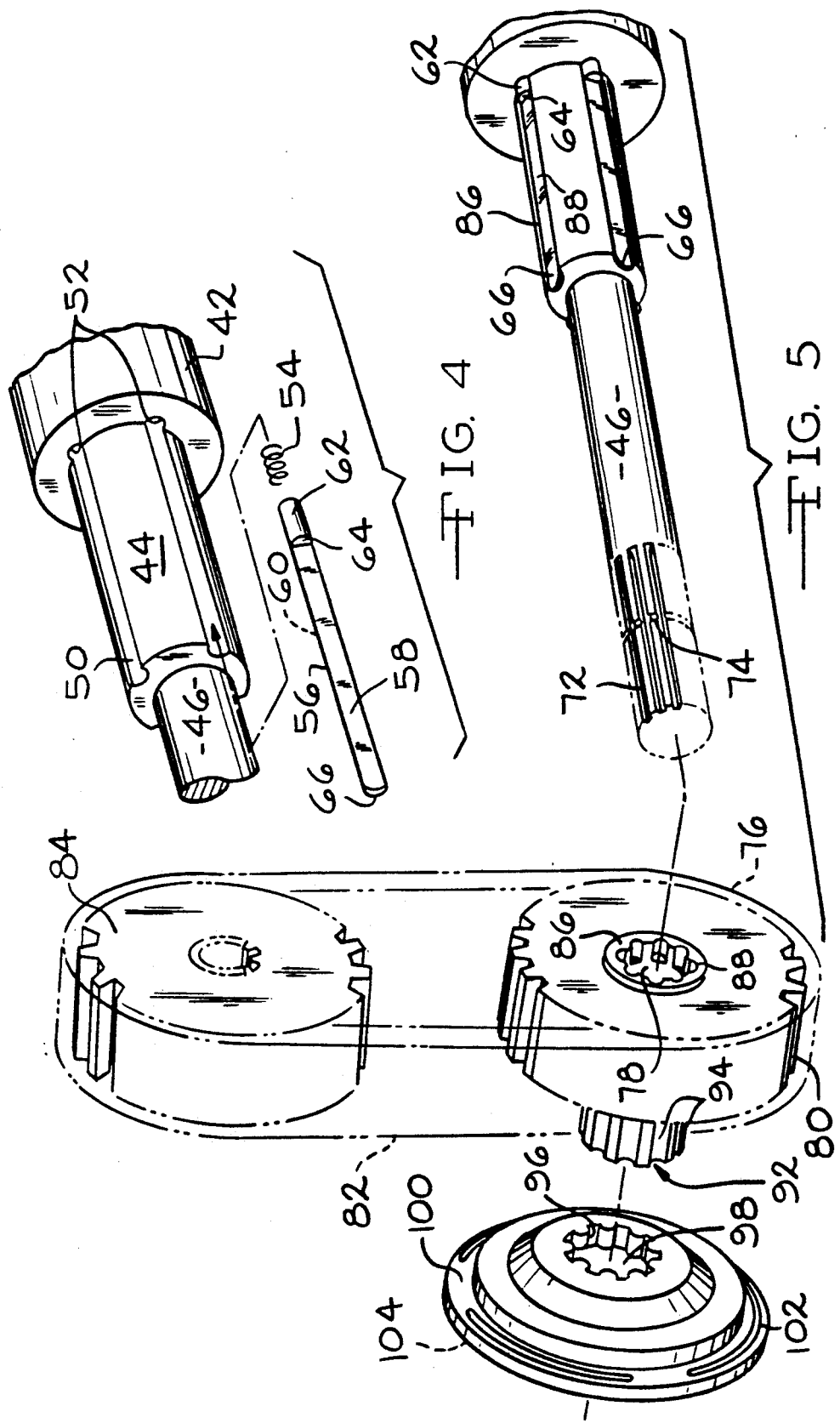

ed # 5,107,972

ELECTROMAGNETIC CLUTCH ASSEMBLY FOR FOUR WHEEL DRIVE SYSTEMS

BACKGROUND OF THE INVENTION

The invention relates generally to electromagnetic clutches, and more specifically to an electromagnetic clutch assembly which finds particular application and utility in motor vehicle, operator selectable two/four wheel drive systems.

A common option on modern cars, light trucks and off road vehicles is operator selectable (part-time) four wheel drive. In addition to conventional two wheel drive train components, these systems include a transfer case for directing a portion of the drive train power to the front wheels, a front prop shaft, a front differential, a pair of live front axles and one of a number of clutch configurations and dispositions for selectively coupling drive energy to the front wheels.

Both the emphasis upon lighter weight, more fuel efficient vehicles and the popularity of such part-time four wheel drive systems has prompted the development of numerous designs for components of such systems, particularly the clutch mechanisms.

One style of clutch commonly used to selectively drive the front wheels of the motor vehicle is a disc pack type clutch. Such a clutch is generally illustrated in U.S. Pat. No. 3,507,374. While such devices exhibit good reliability and power handling ability, they are generally somewhat bulky, resulting in a transfer case housing that is unwieldy or simply unadaptable to smaller vehicles. Secondly, a hallmark of such clutch configurations is their rapid, positive engagement. In part-time four wheel drive power trains, such engagement, when accomplished on the fly, that is, while the vehicle is in motion, may create a transient shock in the power train and a corresponding accelerative or decelerative jerk of the vehicle readily sensed by the driver and occupants. Clearly, then, one desirable feature of such clutches, especially those intended for on the fly engagement, is smooth engagement.

Another desirable feature of such systems are designs which minimize the number of components and thus the weight of the overall four wheel drive system. U.S. Pat. No. 4,667,767 teaches a complex four wheel drive system, having a conventional drive shaft to the rear wheels and further includes a transfer case adjacent the rear differential and prop shafts which extend from the rear mounted transfer case forwardly to the front axle and differential. A centrally disposed transfer case would eliminate several components of this design. A centrally disposed transfer case must, however, be relatively compact and this, in turn, necessitates a compact clutch design.

It is apparent from the foregoing discussion, as well as an assessment of the current state of four wheel drive systems, that improvements thereto are both desirable and possible.

SUMMARY OF THE INVENTION

An electromagnetic clutch assembly especially suitable for use in motor vehicle four wheel drive systems selectively provides power to the front drive components. The clutch assembly includes a through drive shaft about which a clutch armature, clutch rotor, output drive sprocket and other components are coaxially disposed. The drive shaft receives a plurality of spring biased fingers which selectively couple the shaft to the front output drive sprocket. The fingers are translated axially by a like plurality of cam lobes on the rotor. A torsion spring operably disposed between the rotor and the drive shaft maintains the cam lobes in alignment with the fingers. When an electromagnetic coil adjacent the rotor is activated, the drag from the associated front wheel drive components slows the armature and the rotor, rotating the rotor and cam lobes relative to the drive shaft and allowing the fingers to translate axially, thereby coupling the output drive sprocket to the drive shaft. After the clutch is engaged, power to the electromagnetic coil may be significantly reduced. Because of the small size of this unit, it may also be used at each front wheel to selectively couple them to continuously driven front axles.

Thus it is an object of the present invention to provide a compact electromagnetic clutch assembly for use with part-time four wheel drive vehicles.

It is a further object of the present invention to provide an electromagnetic clutch assembly for part-time four wheel drive vehicles which may be engaged while the vehicle is in motion.

It is a still further object of the present invention to provide an electromagnetic clutch assembly for use in part-time four wheel drive vehicles which provides smooth engagement.

It is a still further object of the present invention to provide an electromagnetic clutch assembly for use in part-time four wheel drive vehicles which draws relatively low power to maintain engagement.

It is a still further object of the present invention to provide an electromagnetic clutch assembly which may be utilized either in the transfer case or with the front vehicle hubs.

Further objects and advantages of the present invention will become apparent with reference to the following description of the preferred embodiment and appended drawings.

BRIEF DESCRIPTION OF THE DRAWINGS

FIG. 4 is a fragmentary, perspective view of an input (drive) shaft according to the present invention;

FIG. 5 is a partial, exploded, perspective view of the components of an electromagnetic clutch assembly according to the present invention.

DESCRIPTION OF THE PREFERRED EMBODIMENT

Figure 1:
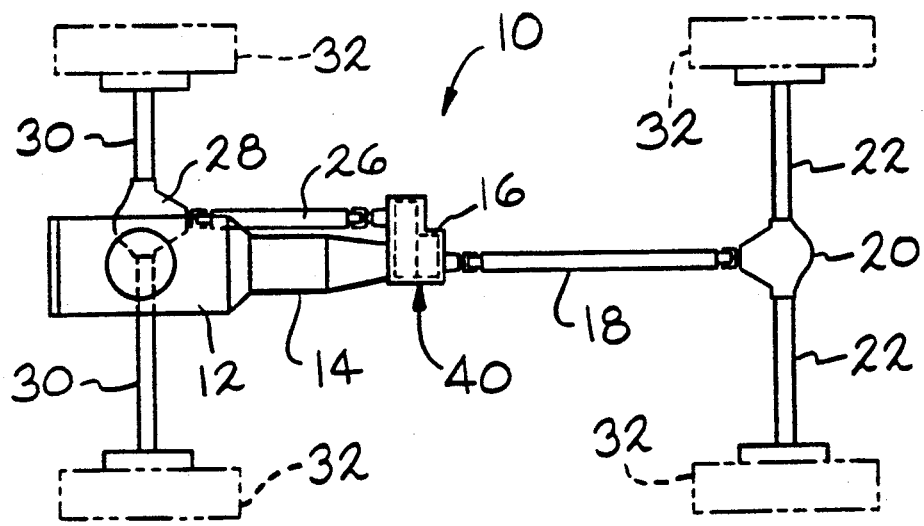
FIG. 1 is a diagrammatic plan view of a power train of a four wheel drive vehicle illustrating the transfer case which includes an electromagnetic clutch according to the present invention.

Referring now to FIG. 1, a diagrammatic illustration of the power train of a part-time four wheel drive vehicle is illustrated and generally designated by the reference numeral 10. The four wheel drive power train 10 includes an engine 12, a transmission 14, a transfer case housing 16, a rear drive or propeller shaft 18, a rear differential 20 and a pair of rear axles 22. Extending to the front of the vehicle from the transfer case housing 16 is a front drive or propeller shaft 26 which directs power to a front differential 28 and a pair of front axles 30. The rear axles 22 and front axles 30 are coupled to and drive ground engaging wheels 32 illustrated in phantom lines. Disposed within the transfer case housing 16 is an electromagnetic clutch assembly 40 according to the present invention.

Figure 2:
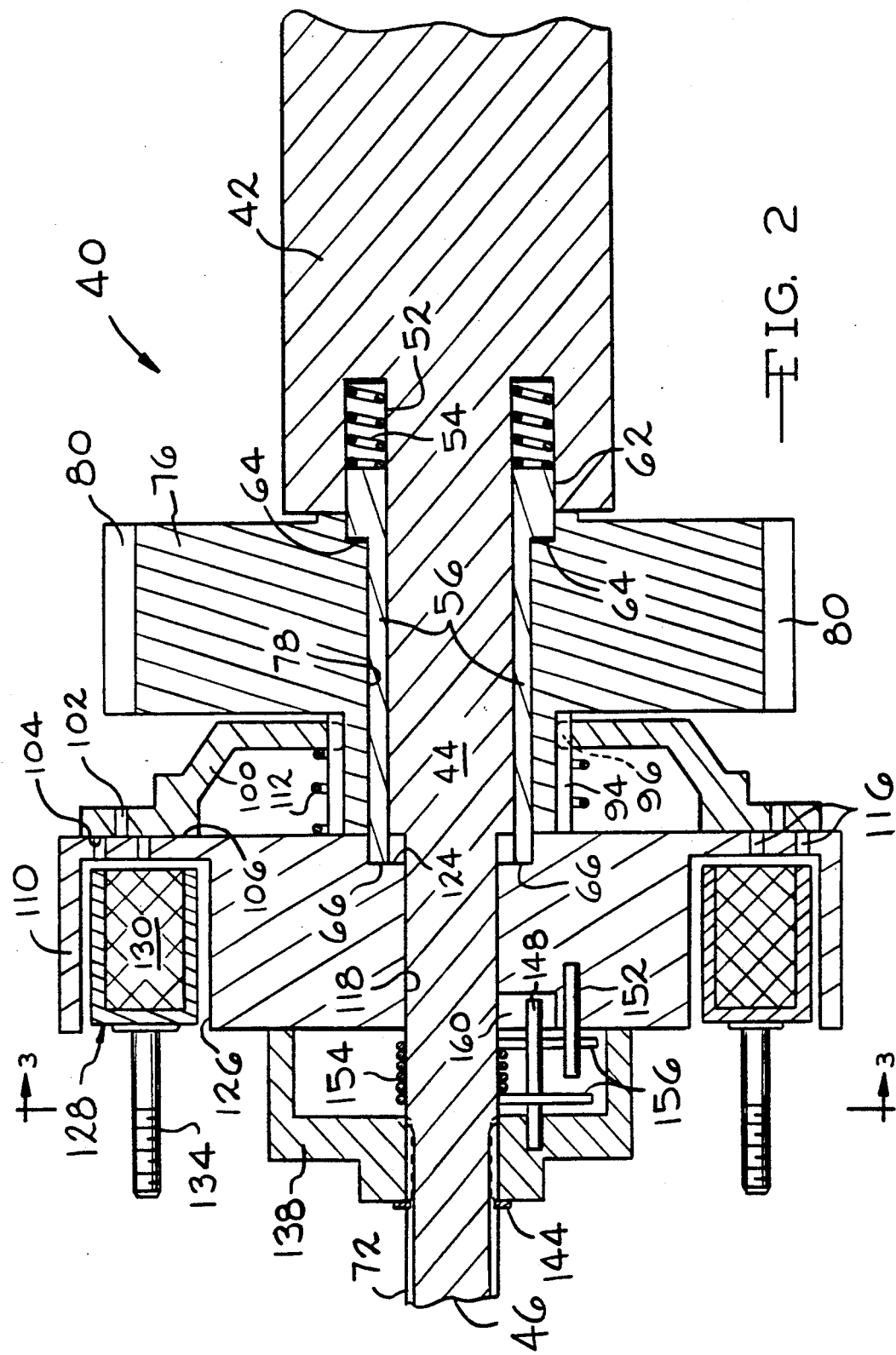
FIG. 2 is a full, sectional view of an electromagnetic clutch assembly according to the present invention in its engaged mode.

Turning now to FIGS. 2, 4 and 5, the electromagnetic clutch assembly 40 includes an input or drive shaft 42 which is coupled to and driven by the output of the transmission 14. The drive shaft 42 defines a first region of largest diameter and is stepped and includes a second, intermediate region 44 of smaller diameter and a third, terminal region 46 of still smaller diameter. The second, intermediate region 44 defines a plurality of substantially semicircular, axially extending channels 50 which terminate in blind circular openings 52 bored into the first, largest diameter region of the drive shaft 42. In the preferred embodiment, there are four axial channels 50 and aligned blind openings 52. However, this number may be increased or decreased primarily depending on the size and power transfer requirements of a given clutch assembly 40.

Received within each of the blind openings 52 is a complementarily sized compression spring 54. Slidably received in each of the axially extending semicircular channels 50 are a like plurality of clutch fingers 56.

The clutch fingers 56 extend into the blind openings 52 and are acted upon by the respective compression springs 54. The clutch fingers 56 define a radially outwardly directed curved face 58 which extends partially along the length of each of the fingers 56 and which defines a radius conforming and equal to the radius of the second, intermediate region 44 of the drive shaft 42. Thus, the outer surface of the second, intermediate region 44, as illustrated in FIG. 5, is effectively a smooth, cylindrical surface.

The rear (radially inwardly directed) face 60 of the clutch fingers 56 and an end adjacent cylindrical portion 62 define a radius substantially equal to the radius of the axial slots 50 and blind openings 52. Thus, as noted, the fingers 56 are slidably received in the axial slots 50 and the cylindrical portions 62 are slidably received within the blind apertures 52. At the end of each of the clutch fingers 56 between the outwardly directed curved faces 58 and the cylindrical portions 62 is disposed a generally semicircular face 64 The ends of the clutch fingers 56 opposite the faces 64 define a cam follower surface 66. The cam follower surface 66 is preferably curved and generally semicircular when viewed along a radial reference line extending from the drive shaft 42.

Typically, the third, terminal region 46 of the shaft 42 includes a plurality of male splines 72, as well as a circumferential groove 74 disposed therein at a short distance from the end of the terminal region 46 of the shaft 42. The male splines 72 may be coupled to a complementary plurality of female splines (not illustrated) which operably connect the terminal region 46 of the drive shaft 42 to the rear prop shaft 18. Alternatively, the terminal region 46 of the drive shaft 42 may extend for any desired length or be coupled to the rear prop shaft 18 by other conventional and well-known devices such as, for example, a universal joint.

A drive sprocket 76 is received upon the second, intermediate region 44 of the drive shaft 42. The drive sprocket 76 defines a through circular aperture 78 and the inside diameter of the aperture 78 and the outside diameter of the second, intermediate region 44 of the drive shaft 42 are such that the drive sprocket 76 may freely rotate upon the intermediate region 44. Thus, the sprocket 76 is not normally coupled to nor driven by the drive shaft 42. The sliding fit of the sprocket 76 on the second, intermediate region 44 of the drive shaft 42 inhibits motion of the clutch fingers 56 other than axial translation and, in fact, maintains them generally in the positions illustrated in FIG. 5. The drive sprocket 76 includes a plurality of teeth 80 disposed about its outer periphery which engage and drive a drive chain 82. The drive chain 82, in turn, engages a transfer case output gear 84 which is coupled to and drives the front drive shaft 26. It will be appreciated that other mechanical configurations may be utilized to transfer power to the front drive shaft 26 and they are deemed to be obvious variations well within the scope of this invention.

The drive sprocket 76 also includes a shoulder 86 which axially spaces the drive sprocket 76 from the drive shaft 42 and reduces friction therebetween. Disposed radially inwardly from the shoulder 86 and extending axially into the drive sprocket 76 are a plurality of semicircular recesses or notches 88. The semicircular notches 88 are complementary to the cylindrical portions 62 of the clutch fingers 56. The notches 88 receive the cylindrical portions 62 of the clutch fingers 56 when the clutch fingers 56 move axially to the left, to the position illustrated in FIG. 2. Engagement of the cylindrical portions 62 of the clutch fingers 56 with the notches 88 positively rotationally couples the drive sprocket 76 to the drive shaft 42 and thus provides power from the drive shaft 42 to the front drive shaft 26.

Figure 6:
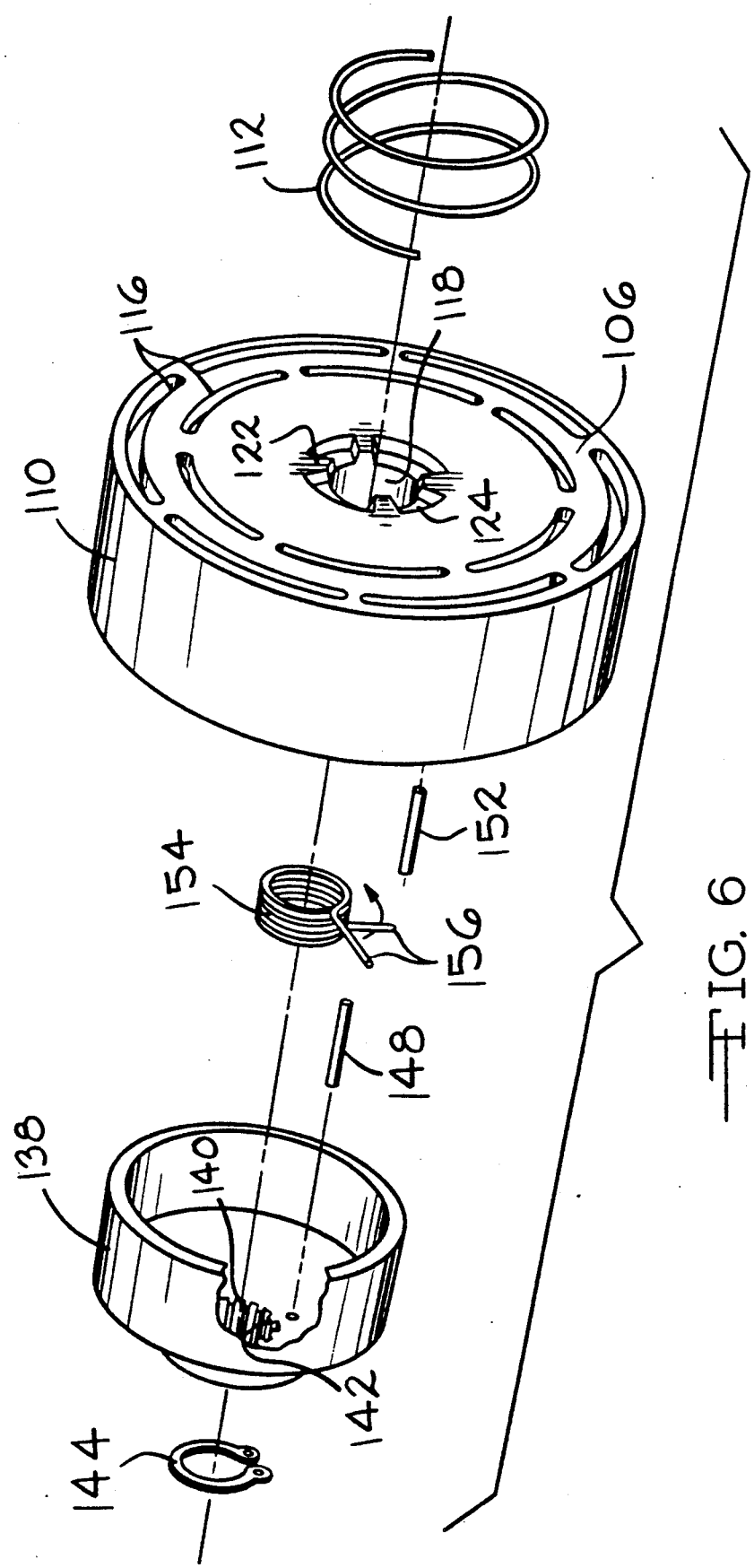
FIG. 6 is a second, partial, exploded, perspective view of the components of an electromagnetic clutch assembly according to the present invention.

Referring now to FIGS. 2, 5 and 6, the drive sprocket 76 also includes a reduced diameter region 92 which includes a plurality of male splines 94. The male splines 94 are complementary to, slidingly axially receive and rotationally engage female splines 96 formed on the inner surface of an aperture 98 in an armature plate 100. The armature plate 100 is generally frusto-conically shaped and defines a discontinuous circle of arcuate through slots 102. The armature plate also defines a first friction clutch face 104 disposed parallel to and in facing opposition with a second friction clutch face 106 defined by a rotor 110.

Disposed concentrically about the splines 94 on the reduced diameter region 92 of the drive sprocket 76 and between the armature plate 100 and the rotor 110 is a compression spring 112. The compression spring 110 urges the armature plate 100 toward the drive sprocket 76 and away from the rotor 110.

The rotor 110 likewise defines two discontinuous circles of arcuate through slots 116 which are spaced in radial alternation with the slots 102 of the armature plate 100. The rotor 110 includes a through, centrally disposed circular aperture 118 having a diameter sized to slidably and freely rotationally receive the third, smallest diameter terminal region 46 of the drive shaft 42.

The face of the rotor 110 defining the second clutch face 106 includes a plurality of circumferentially spaced apart cam lobes 122 adjacent the aperture 118 which are separated by reentrant regions 124. As illustrated, there are four cam lobes 122, one each of which is associated with one of the clutch fingers 56. This relationship must be maintained and if additional clutch fingers 56 are utilized, additional cam lobes 122 must be utilized such that each clutch finger 56 is associated with one cam lobe 122. It will be appreciated that the axial distance between the top of the cam lobes 122 and the bottom of the reentrant regions 124 must be great enough to provide sufficient axial travel to the clutch fingers 56 so that full disengagement and sufficient axial engagement with the notches 88 of the drive sprocket 78 is achieved.

Figure 3:
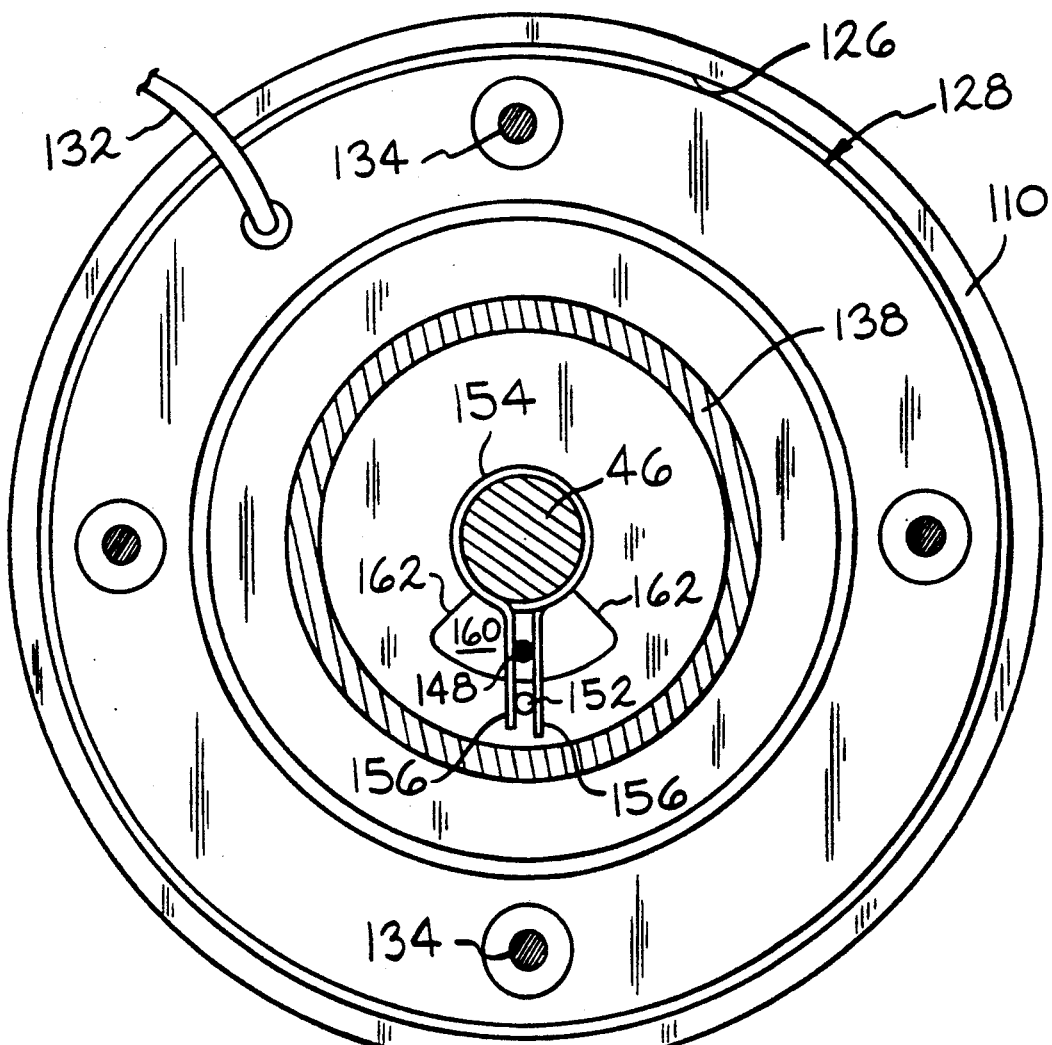
FIG. 3 is a full, sectional view of an electromagnetic clutch assembly according to the present invention taken along line 3—3 of the FIG. 2.

Turning now to FIGS. 2, 3 and 6, the rotor 110 also includes a deep reentrant circumferential channel 126 which receives a stationary electromagnetic coil assembly 128. The coil assembly 128 includes a conventional magnetic winding 130 which is connected through a suitable conductor 132 to an operator controlled power source (not illustrated). Mounting studs 134 are coupled to suitable features of the transfer case housing 16 to support the electromagnetic coil assembly 128. Activation of the electromagnetic coil assembly 128 draws the armature plate 100 toward the rotor 110 in conventional fashion against the force of the compression spring 112. Cessation of power to the electromagnetic coil assembly 128 results in the armature plate 100 translating axially toward the drive sprocket 76 under the force of the compression spring 112 and decoupling of the rotor 110 from the armature plate 100.

A circular collar 138 includes a concentric, through aperture 140 which defines a plurality of female splines 142 on its surface The female splines 142 are complementary to and engage the splines 72 on the third, terminal region 46 of the drive shaft 42. A snap ring 144 is received within the circumferential groove 74 and retains the circular collar 138 on the terminal region 46 of the drive shaft 42. Extending along an axis parallel to and spaced from the opening 140 and the terminal region 46 of the drive shaft 42 and secured to the circular collar 138 is a first register pin 148. Similarly, a second register pin 152 is disposed parallel to and spaced from the circular aperture 118 in the rotor 110 and is thus parallel to the drive shaft 42. The register pins 148 and 152 are disposed at distinct radial distances from the axis of the terminal region 46 of the shaft 42 such that they do not and can not contact or interfere with one another. Preferably, the first register pin 148 is disposed at a smaller radius from the terminal region 46 of the shaft 42 than the second register pin 152.

A torsion spring 154 having radially extending tangs 156 is received about the third, terminal region 46 of the drive shaft 42 and the tangs 156 engage the register pins 148 and 152. As illustrated in FIG. 6, the torsion spring 154 is preloaded to between about 20 to 30 pounds—feet of torque. While the rotor 110 may rotate relative to the third, terminal region 46 of the drive shaft 42, the torsion spring 154 provides a restoring force which will attempt to and will return it to the position illustrated in FIG. 3. A generally arcuate recess 160 in the rotor 110 having a pair of radially oriented walls 162 defining an angle of approximately 90° receives the free end of the first register pin 148. The walls 162 limit relative rotation between the rotor 110 and the drive shaft 42 to approximately 45° in either direction from center by interfering with the free end of the first register pin 148.

It will be noted that the purpose of the rotational limit stops comprising the walls 162 of the arcuate recess 160 and the register pin 148 is to ensure that the cam follower surfaces 66 of the clutch fingers 56 engage the center of the reentrant regions 124 between the cam lobes 122 when the clutch assembly 40 is engaged to facilitate optimum engagement of the cylindrical portions 62 of the clutch fingers 56 with the notches 88 of the drive sprocket 76. Accordingly, if additional or fewer clutch fingers 56 and cam lobes 122 are utilized, the preferred included angle of the arcuate recess 160 is found by dividing the number of fingers 56 or cam lobes 122 into 360. For example, if six clutch fingers 56 and cam lobes 122 are utilized in the clutch assembly 40, the included angle of the arcuate recess 160 should be 60°, thereby providing rotational limits at ±30°.

The operation of the electromagnetic clutch assembly 40 according to the present invention is straightforward. When a vehicle incorporating the present invention is in conventional, two wheel drive, the drive sprocket 76 free wheels on the intermediate region 44 of the drive shaft 42 because the clutch fingers 56 and specifically the cam follower surfaces 66 are aligned with the cam lobes 122 on the rotor 110. So aligned, the cylindrical portions 62 of the clutch fingers 56 are axially displaced from the notches 88 of the drive sprocket 76. Accordingly, no power is transferred to the drive sprocket 76 and the associated front wheel drive components. Power is transferred along the drive shaft 42 and to components coupled to and driven by the splines 72 on the terminal region 46 of the drive shaft 42.

When the operator of the vehicle engages four wheel drive while the vehicle is moving, a current of approximately four amperes at 12 volts D.C. is introduced to the electromagnetic coil 130. The magnetic field so generated attracts the armature plate 100 and axially translates it to the left, against the force of the compression spring 112, to the position illustrated in FIG. 2, adjacent the rotor 110. As the armature plate 100 contacts the spinning rotor 110, it begins to gain speed while at the same time applying a drag torque to the rotor 110 due to the drag of the front wheel drive components which are coupled to the drive sprocket 76 through the chain 82 and associated elements. The drag torque rotates the rotor 110 against the force of the torsion spring 154 such that the cam follower surfaces 66 of the clutch fingers 56 translate off the cam lobes 122 and into the reentrant regions 124 therebetween. As illustrated in FIG. 2, the clutch fingers 56 axially translate to the left.

The cylindrical portions 62 of the clutch fingers 56 will ratchet against the notches 88 until the speed difference between the drive shaft 42 and the drive sprocket 76 is small enough that the clutch fingers 56, and specifically the cylindrical portions 62, engage the notches 88. At this time, the drive sprocket 76 is positively coupled to the drive shaft 42 and thus provides positive drive to the front wheel drive components of the vehicle. Current to the electromagnetic coil 130 may now be reduced to a point which simply maintains the position of the rotor 110. Typically, the drive current to the electromagnetic coil 130 may be reduced after 3-5 seconds. Significant energy can thus be saved.

The foregoing assumes that the vehicle is in motion. If it is not, substantially the same engagement sequence will occur as soon as there is sufficient vehicle motion to create drag on the rotor 110 and move the clutch fingers 56 off the cam lobes 122.

To return the vehicle to two wheel drive, the maintenance current to the coil 130 is terminated. The armature plate 100 then translates to the right in FIG. 2, driven by the force of the compression spring 112 and the rotor 110 returns to the initial position with the cam follower surfaces 66 of the clutch fingers 56 aligned with the cam lobes 122 by virtue of the force provided by the torsion spring 154. This action occurs whether the vehicle is moving or stationary.

While illustrated in conjunction with a conventional transfer case 16 disposed at the output of a vehicle transmission 14, it will be appreciated that the clutch assembly 40 here disclosed may be readily utilized at each front wheel location to couple and decouple the front wheels from the respective front axles which are driven continuously by front axle drive components. In this case, since each of the clutch mechanisms carries generally about one-half the torque of a clutch assembly disposed within a transfer case housing 16, the components of the clutch assembly 40 may be designed more compactly. Furthermore, given the straightforward design, low power consumption, compactness and relatively high torque transmission capability, the clutch assembly 40 according to the present invention will find application in other power transmission systems wherein the foregoing criteria are controlling or significant design parameters.

The foregoing disclosure is the best mode devised by the inventor for practicing this invention. It is apparent, however, that devices incorporating modifications and variations will be obvious to one skilled in the art of electro-mechanical clutches. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. An electromagnetic clutch apparatus (40) comprising, in combination,
   a shaft (44, 46) having a driven end (42) and a plurality of axially extending slots(50),
   a plurality of clutch fingers (56) disposed in said plurality of axially extending slots (50),
   a drive member (76) concentrically disposed about said shaft (44, 46) and including means (88) for engaging a portion of said clutch fingers (56),
   a clutch assembly including
      a first clutch member (100) coupled to said drive member (76) by a splined interconnection (94, 96),
      a second clutch member (110) disposed upon said shaft (44, 46), said second clutch member (110) including a plurality of cam lobes (122) disposed in operable relationship with said clutch fingers (56),
      first means (154) for urging said second clutch member (110) into a rotational position in which said clutch fingers (56) are aligned with said cam lobes (122),
      second means (112) for urging said first (100) and said second (110) clutch members apart, and
      third means (130) for urging said first (100) and said second (110) clutch members together.

2. The clutch apparatus (40) of claim 1 further including means (148, 162) for limiting the relative rotation between said second clutch member (110) and said shaft (44, 46).

3. The clutch apparatus (40) of claim 1 wherein said plurality of clutch fingers (56) includes four clutch fingers and further including stop means (148, 162) for limiting the relative rotation between said second clutch member (110) and said shaft (44, 46) to ±45°.

4. The clutch apparatus (40) of claim 1 wherein said first means (154) for urging said second clutch member (110) is a torsion spring (154).

5. The clutch apparatus (40) of claim 4 wherein said torsion spring (154) is preloaded.

6. The clutch apparatus (40) of claim 1 wherein said second means (112) for urging is a compression spring (112).

7. The clutch apparatus (40) of claim 1 wherein said third means (130) for urging is an electromagnetic coil (130).

8. An electromagnetic clutch apparatus (40) comprising, in combination,
   a drive shaft (44, 46) having a plurality of axially extending slots (52),
   a drive sprocket (76) disposed about said drive shaft (44, 46),
   a plurality of clutch fingers (56) disposed in said axially extending slots (52) and translatable between first positions in which said drive sprocket (76) is free to rotate on said drive shaft (44, 46) and a second positions in which said drive sprocket (76) is coupled to said drive shaft (44, 46),
   a clutch assembly including
      a clutch armature (100) disposed for rotation with said drive sprocket (76),
      a clutch rotor (110) disposed upon said drive shaft (44, 46), said clutch rotor (110) defining a plurality of raised cams (122) and reentrant regions (124) disposed in operable relationship with said clutch fingers (56),
      means (154) operably disposed between said clutch rotor (110) and said drive shaft (44, 46) for biasing said rotor (110) toward a position in which said clutch fingers (56) are in said first positions,
      spring means (112) for urging said clutch rotor (110) and said clutch armature (100) apart, and
      drive means (130) for urging said clutch rotor (110) and said clutch armature (100) together.

9. The clutch apparatus (40) of claim 8 wherein said clutch rotor (110) and said clutch armature (100) both include friction faces (106, 104).

10. The clutch apparatus (40) of claim 8 wherein said spring means (112) is a compression spring (112) and said drive means (130) is an electromagnetic coil (130).

11. The clutch apparatus (40) of claim 8 further including means (54) for biasing said clutch fingers (56) toward said second positions.

12. The clutch apparatus (40) of claim 8 further including means (148, 162) for limiting the rotation of said clutch rotor (110) relative to said drive shaft (44, 46).

13. The clutch apparatus (40) of claim 8 wherein said clutch fingers (56) include a curved cam surface (66) at one end and a radially extending portion (64) at the opposite end and said drive sprocket (76) includes notches (88) for receiving and engaging said radially extending portions (64) of said clutch fingers (56).

14. An electromagnetic clutch assembly (40) comprising, in combination,
   a drive shaft (44, 46) having a plurality of axially extending slots (50),
   a drive sprocket (76) disposed for rotation on said drive shaft (44, 46),
   a plurality of clutch fingers (56) disposed in said axially extending slots (50), said clutch fingers (56) translatable between first, disengaged positions in which said drive sprocket (76) is free to rotate on said drive shaft (44, 46) and second, engaged positions in which said drive sprocket (76) is coupled to said drive shaft (44, 46), a clutch armature (100) disposed for rotation with said drive sprocket (76), a clutch rotor (110) disposed on said drive shaft (44, 46) including a plurality of cams (122) engageable by said clutch fingers (56), spring means (154) operably disposed between said clutch rotor (110) and said drive shaft (44, 46) for maintaining a desired rotational position of said clutch rotor (110) relative to said drive shaft (44, 46) in which said clutch fingers (56) are disposed in said first positions, spring means (112) for urging said clutch armature (100) and said clutch rotor (110) apart, and electromagnet means (130) for urging said clutch armature (100) and said clutch rotor (110) together.

15. The electromagnetic clutch assembly (40) of claim 14 wherein said clutch fingers (56) include a portion (64) extending radially outwardly from said drive shaft (44, 46) and said drive sprocket (76) includes a plurality of recesses (88) for receiving said radially extending portions (64) of said clutch fingers (56).

16. The electromagnetic clutch assembly (40) of claim 14 wherein said clutch armature (100) is coupled to said drive sprocket (76) by a splined interconnection (96, 94).

17. The electromagnetic clutch assembly (40) of claim 14 further including means (54) for biasing said clutch fingers (56) toward said second, engaged positions.

18. The electromagnetic clutch assembly (40) of claim 14 further including means (148, 162) for limiting the rotation of said clutch rotor (110) relative to said drive shaft (44, 46).

19. The electromagnetic clutch assembly (40) of claim 18 wherein said plurality of clutch fingers (56) includes four of said fingers (56) and said limiting means (148, 162) limits relative rotation between said rotor (110) and said drive shaft (44, 46) to ±45°.

20. The electromagnetic clutch assembly (40) of claim 14 wherein said drive sprocket (76) includes teeth (80) about its periphery for engaging and driving a chain (82).

* * * * *